United States Patent
Kondo et al.

(10) Patent No.: US 8,425,143 B2
(45) Date of Patent: Apr. 23, 2013

(54) END ANCHORING STRUCTURE AND METHOD FOR FIBER-REINFORCED PLASTIC FILAMENT BODY

(75) Inventors: Shinobu Kondo, Tokyo (JP); Kenichi Ushijima, Tokyo (JP)

(73) Assignee: Tokyo Rope Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 13/389,591

(22) PCT Filed: Aug. 6, 2010

(86) PCT No.: PCT/JP2010/063731
§ 371 (c)(1),
(2), (4) Date: Feb. 8, 2012

(87) PCT Pub. No.: WO2011/019075
PCT Pub. Date: Feb. 17, 2011

(65) Prior Publication Data
US 2012/0141198 A1 Jun. 7, 2012

(30) Foreign Application Priority Data
Aug. 12, 2009 (JP) ................. 2009-186947

(51) Int. Cl.
*E04C 5/12* (2006.01)
*B25G 3/28* (2006.01)
*F16B 2/14* (2006.01)

(52) U.S. Cl.
USPC ....................... 403/368; 52/223.13

(58) Field of Classification Search .......... 403/367–371; 52/223.13, 223.14
See application file for complete search history.

(56) References Cited

U.S. PATENT DOCUMENTS

| | | | |
|---|---|---|---|
| 2,865,978 A * | 12/1958 | Modrey | 174/69 |
| 3,917,900 A * | 11/1975 | Arnaudin, Jr. | 174/107 |
| 4,157,602 A * | 6/1979 | Pennell | 24/370 |
| 5,233,730 A * | 8/1993 | Milne et al. | 24/136 R |
| 5,749,211 A * | 5/1998 | Kimura et al. | 57/217 |
| 5,802,788 A * | 9/1998 | Ozawa et al. | 52/223.13 |
| 6,082,063 A * | 7/2000 | Shrive et al. | 52/223.13 |
| 7,857,542 B2 * | 12/2010 | Burtscher | 403/369 |
| 2008/0060298 A1 * | 3/2008 | Fahim et al. | 52/309.14 |
| 2008/0279622 A1 * | 11/2008 | Al-Mayah et al. | 403/374.1 |

FOREIGN PATENT DOCUMENTS

| | | |
|---|---|---|
| EP | 1380705 A2 * | 1/2004 |
| JP | 61-161327 U | 10/1986 |
| JP | 1-272889 A | 10/1989 |
| JP | 2-054049 A | 2/1990 |
| JP | 4-163382 A | 6/1992 |
| JP | 5-033425 A | 2/1993 |
| JP | 08135090 A * | 5/1996 |
| JP | 2006-176957 A | 7/2006 |
| JP | 2006176957 A * | 7/2006 |

* cited by examiner

OTHER PUBLICATIONS

International Search Report dated Sep. 7, 2010, in International Application No. PCT/JP2010/063731.

*Primary Examiner* — Joshua Kennedy
(74) *Attorney, Agent, or Firm* — McGinn IP Law Group, PLLC

(57) ABSTRACT

An end portion of a carbon fiber-reinforced plastic cable (1) is covered with a friction sheet (2) having abrasive particles (2*a*) adhered to top and bottom surfaces thereof, the friction sheet is covered from above with a braided net tube (3) obtained by braiding a steel wire, and the portion covered with the friction sheet (2) and braided net tube (3) is embraced and secured inside an end socket (4) by a wedge (5). The end socket (4) can be secured rapidly and reliably to the end portion of the carbon fiber-reinforced plastic cable (1) while maintaining a comparatively high anchoring efficiency.

13 Claims, 6 Drawing Sheets

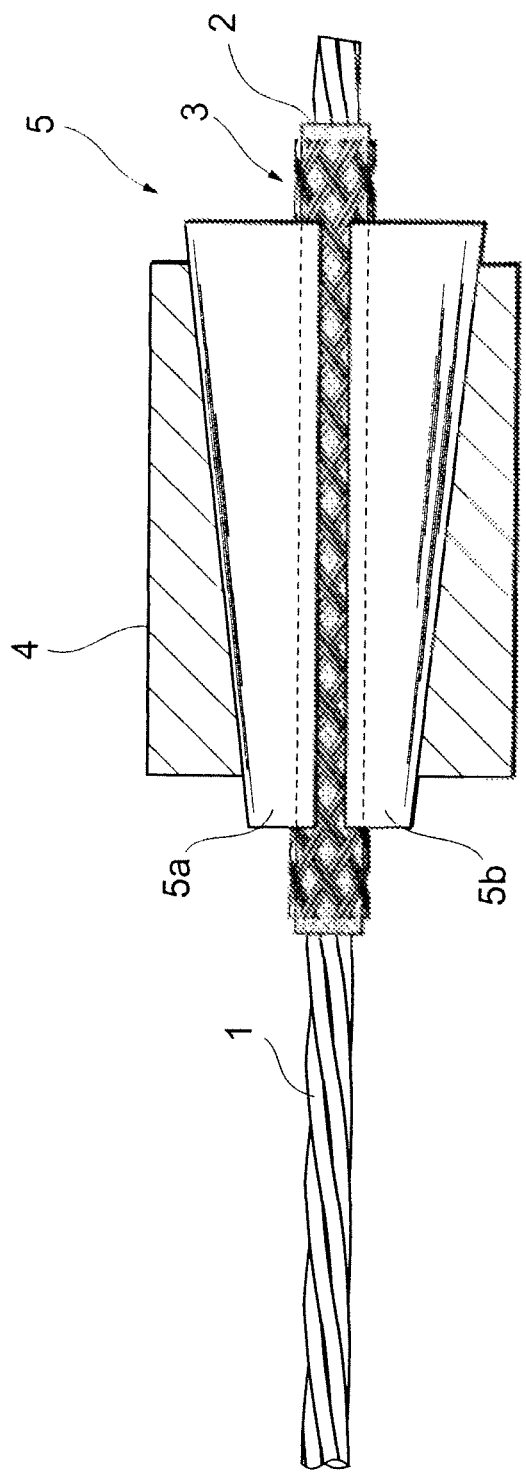

END ANCHORING STRUCTURE AND METHOD FOR FIBER-REINFORCED PLASTIC FILAMENT BODY

TECHNICAL FIELD

This invention relates to an anchoring structure and method for anchoring (securing) a socket (anchoring device) to the end portion of a filament body made of fiber-reinforced plastic.

BACKGROUND ART

FRP (Fiber-Reinforced Plastic) composed of a composite of fiber and plastic exhibits a high strength, and a cable (rope or rod) fabricated using FRP is light in weight in comparison with PC stranded wire and has excellent characteristics such as a high corrosion resistance and a non-magnetic property. Fibers such as carbon fibers, glass fibers and Kevlar fibers have been used as fiber material employed in FRP, and resins such as epoxy resin, polyamide resin and phenol resin have been used as the plastic material in FRP. FRP cables are being used as the stressing members in prestressed concrete, by way of example.

While an FRP cable exhibits a high strength equivalent to that of PC stranded wire with regard to tension in the longitudinal direction, it is weak against local shearing force and surface scratching, etc. As a consequence, when a socket is secured to the end portion of the cable by directly forcing in a wedge in a manner similar to that of a PC stranded wire, severance due to shearing damage and sliding due to surface-layer damage occur and a high anchoring efficiency between the cable and socket cannot be obtained.

In order to arrange it so that shearing force will not concentrate in the cable locally at the socket anchoring portion (fixing portion), the conventional approach is to insert the end of the cable into the socket, followed by filling the gap between the cable and the socket with a thermosetting resin and then hardening the resin, or filling the gap with an expanding agent and integrating the cable and the socket owing to the pressure of expansion of the expanding agent (e.g., see Japanese Patent Application Laid-Open No. 1-272889).

With regard to both thermosetting resin and expanding agent, however, it takes a certain amount of time for the resin to harden or for the expanding agent to expand. Further, since stringent temperature management is necessary during hardening or expansion, a special apparatus and space for the apparatus are required. If is difficult to secure the socket to the cable end at the work site, etc., and securing is necessary beforehand at the factory.

DISCLOSURE OF THE INVENTION

An object of the present invention is to arrange it so that an end socket can be secured rapidly and reliably to the end portion of a fiber-reinforced plastic filament body while maintaining a comparatively high anchoring efficiency.

A fiber-reinforced plastic filament body is obtained by forming into filaments a material that is the result of compounding (mixing) a fiber material such as carbon fiber, glass fiber or Kevlar fiber and a resin material such as epoxy resin, polyamide resin or phenol resin. The filament body has a substantially uniform cross-sectional shape in the longitudinal direction and a length which is comparatively large in comparison with the diameter. The term "filament body" is inclusive of a cable, rope or rod, etc.

An end anchoring structure of a fiber-reinforced plastic filament body according to the present invention is characterized in that an end portion of a fiber-reinforced plastic filament body is covered with a friction sheet having abrasive particles adhered to top and bottom surfaces thereof, the friction sheet is covered from above with a braided net tube obtained by braiding a metal wire, and the portion covered with the friction sheet and braided net tube is embraced and secured inside an end socket by a wedge.

A method of anchoring an end of a fiber-reinforced plastic filament body according to the present invention comprises covering an end portion of a fiber-reinforced plastic filament body with a friction sheet having abrasive particles adhered to top and bottom surfaces thereof, further covering the friction sheet from above with a braided net tube obtained by braiding a metal wire, embracing by a wedge the portion covered with the friction sheet and braided net tube, and wedging this portion inside an end socket.

The end portion of the fiber-reinforced plastic filament body is wedged inside the end socket. For example, the end portion of the fiber-reinforced plastic filament body is embraced by a wedge (two half bodies) that has been split in half along the longitudinal direction, and the end portion is pushed into the end socket. It goes without saying that the end socket has a hollow portion the shape whereof corresponds to the wedge. The wedge that embraces the end portion of the fiber-reinforced plastic filament body is pushed tightly into the hollow portion of the end socket, whereby the end socket is anchored (secured) to the end portion of the fiber-reinforced plastic filament body.

In accordance with the present invention, since the end portion of a fiber-reinforced plastic filament body is covered with a friction sheet and this is further covered from above with a braided net tube obtained by braiding a metal wire, local shearing force acting upon the fiber-reinforced plastic filament body owing to the wedge is dispersed (buffered) by the friction sheet and braided net tube. The fiber-reinforced plastic filament body is not readily severed at the position of the end socket (the position of the wedge) and a high anchoring efficiency (tensile strength) can be assured.

Further, according to the present invention, since the end portion of a fiber-reinforced plastic filament body is covered with a friction sheet obtained by adhering abrasive particles to its upper and lower surfaces, the fiber-reinforced plastic filament body will not readily pull out of the end socket (wedge) thanks to frictional force even if the filament body is pulled strongly in the longitudinal direction. Furthermore, since the braided net tube is obtained by braiding a metal wire, a certain degree of frictional force is produced by the braided net tube as well. The end portion of the fiber-reinforced plastic filament body will not readily pull out of the end socket by virtue of both the friction sheet and braided net tube.

As mentioned above, it is also possible for the end portion of a fiber-reinforced plastic filament body to be fixed inside an end socket by a thermosetting resin or expanding agent or the like. However, with fixation using hardening of a resin or expansion, the charging of the thermosetting resin or expanding agent to the hardening or expansion (integration) takes a certain amount of time and stringent temperature management is necessary during the hardening or expansion. By contrast, according to the present invention, the end socket is secured to the end portion of the fiber-reinforced plastic filament body by wedging and therefore the end socket can be secured to the end portion of the fiber-reinforced plastic filament body rapidly and easily on site (at the work site, etc.) without the necessity of temperature management. Since it is unnecessary to secure the end socket to the end portion of the fiber-reinforced plastic filament body in advance (on site, etc.), packaging and transport can be simplified. Since the position at which the end socket is secured can be changed freely, it is possible to deal with a sudden change in specifications on site.

In an embodiment, abrasive particles are adhered to at least the inner peripheral surface of the braided net tube. The frictional force between braided net tube and the friction sheet situated on the inner peripheral side thereof is increased and sliding between the friction sheet and braided net tube is prevented effectively. Abrasive particles may be adhered also to the outer peripheral surface of the braided net tube as a matter of course.

Preferably, both the friction sheet and braided net tube used would have a length in the longitudinal direction thereof greater than the length of the wedge in the longitudinal direction thereof. Shearing force ascribable to the wedge is effectively prevented from acting upon the fiber-reinforced plastic filament body locally by covering the area of the fiber-reinforced plastic filament body embraced by the wedge with the friction sheet and braided net tube over the entire length of the area.

The friction sheet may be made multilayered, e.g., two or three layers, and may cover the end portion of the fiber-reinforced plastic filament body.

In an embodiment, the braided net tube is obtained by braiding a strand formed by twisting together a plurality of metal wires. Since deformation readily occurs when pressure is applied to the wedge, the buffering action can be enlarged. Further, frictional force is increased by roughness between the metal wires and between the strands.

BRIEF DESCRIPTION OF THE DRAWINGS

FIG. 6 is a sectional view illustrating a manufacturing step of an end anchoring structure.

BEST MODE FOR CARRYING OUT THE INVENTION

Figure 1:
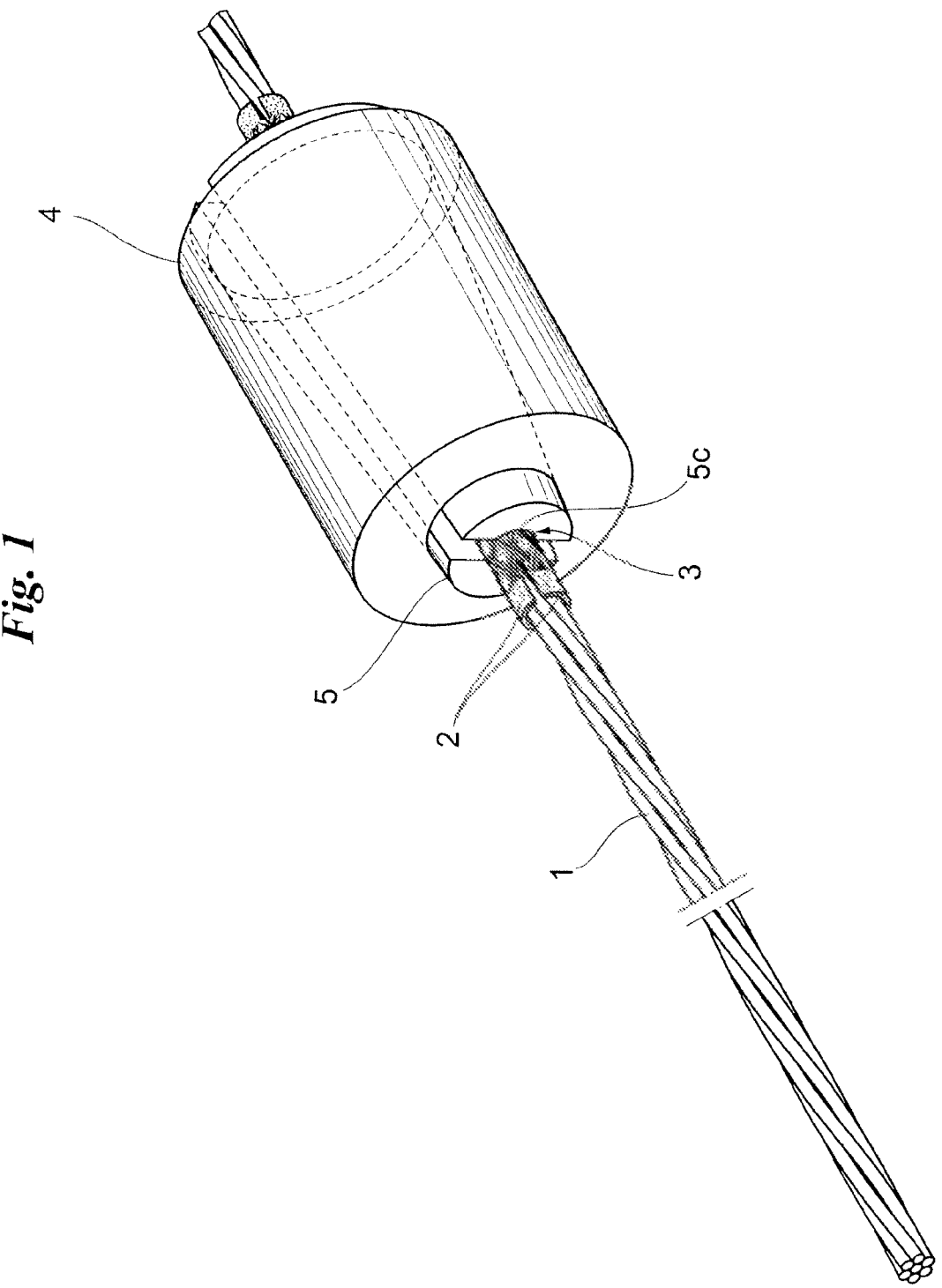
FIG. 1 is a perspective view in which an end anchoring structure has been applied to the end of a cable made of carbon fiber-reinforced plastic.

FIG. 1 is a perspective view illustrating an embodiment in which an end anchoring structure has been applied to the end of a carbon fiber-reinforced plastic (CFRP) cable [also referred to as a "Carbon Fiber Composite Cable" (CFCC)] (written as "CFRP cable 1" below). Since the details of the end anchoring structure shown in FIG. 1 will become apparent by describing the manufacturing steps thereof, the manufacturing steps of the end anchoring structure shown in FIG. 1 will be described with reference to FIGS. 2 to 6.

Figure 2:
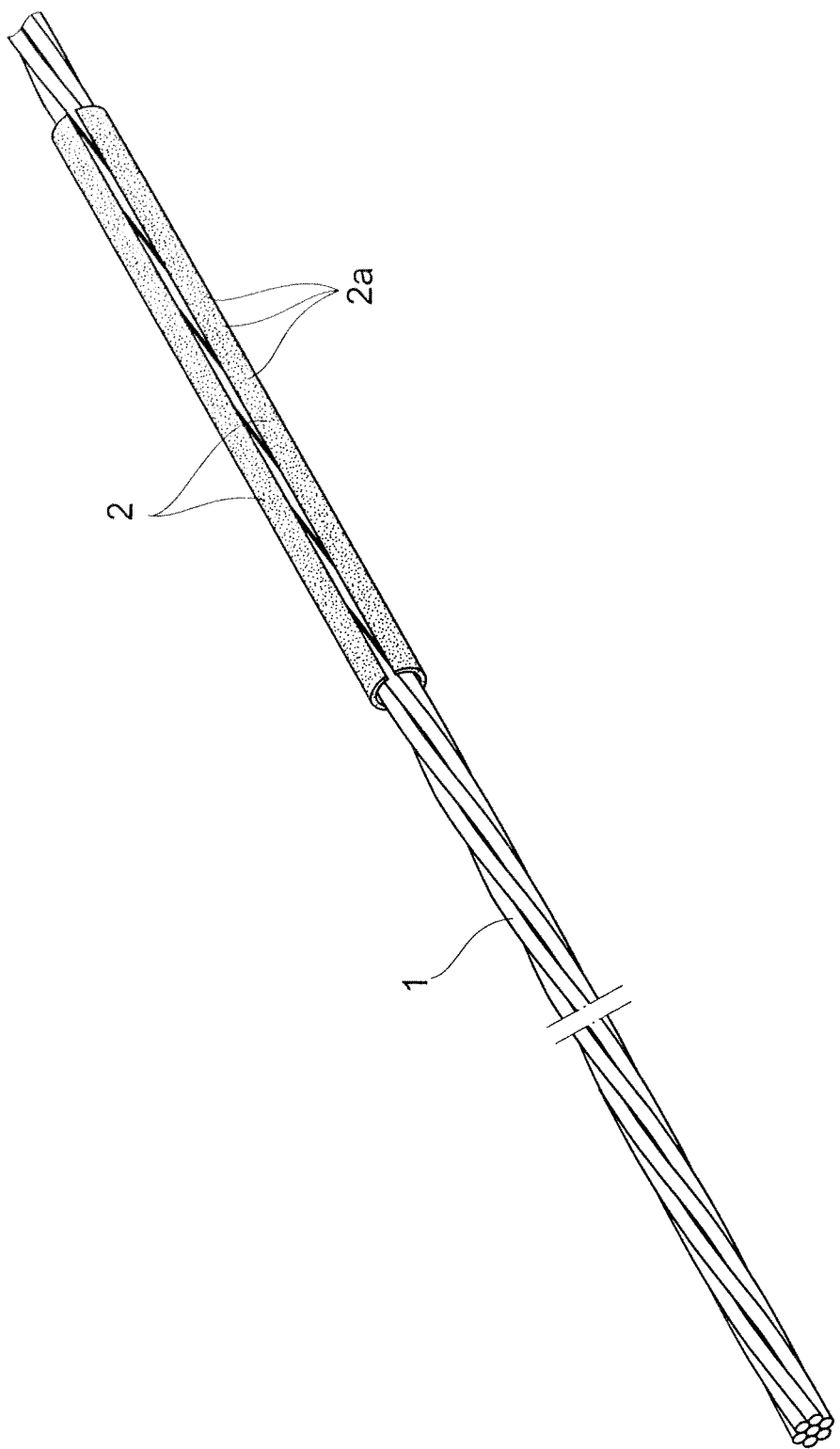
FIG. 2 is a perspective view illustrating a manufacturing step of an end anchoring structure.

With reference to FIG. 2, a CFRP cable 1 is prepared and the vicinity of the end portion of the cable is covered with a friction sheet 2. The CFRP cable 1 is formed by twisting together wires having a circular cross section, a composite of carbon fibers and epoxy resin being adopted as the material constituting the wires. The CFRP cable 1 shown in FIG. 2 has a 1×6 structure (a structure in which six wires are twisted about the periphery of a single wire at the center).

The friction sheet 2 that covers the vicinity of the end portion of the CFRP cable 1 is obtained by adhering (applying) a multiplicity of abrasive particles 2a (aluminum oxide, silicon carbide, etc.) to the top and bottom surfaces of a sheet-like synthetic fiber (or wire gauze having a fine mesh) and exhibits flexibility. In this embodiment, the abrasive particles 2a are used in order to increase frictional force. The friction sheet 2 is curved along the outer periphery of the CFRP cable 1.

The length of the friction sheet 2 is greater than the longitudinal length of a wedge 5, described later, and the width thereof is slightly smaller than the cross-sectional semicircumference of the CFRP cable 1. The outer peripheral surface of the CFRP cable 1 is covered with a pair of the friction sheets 2 so as to envelop the outer peripheral surface of the end portion of the CFRP cable 1. Preferably, two (or three) of the friction sheets 2 are superimposed in two (or three) layers and these cover the outer peripheral surface of the CFRP cable 1. It may be arranged so that one end or both ends of the friction sheet 2 are readily affixed to the vicinity of the end portion of the CFRP cable 1 using an adhesive tape or the like. As shown in FIG. 2, the CFRP cable 1 may be covered with a pair of the friction sheets 2 so as to embraced by the sheets, or alternatively, the friction sheet 2 may be wound helically upon the CFRP cable 1.

Figure 3:
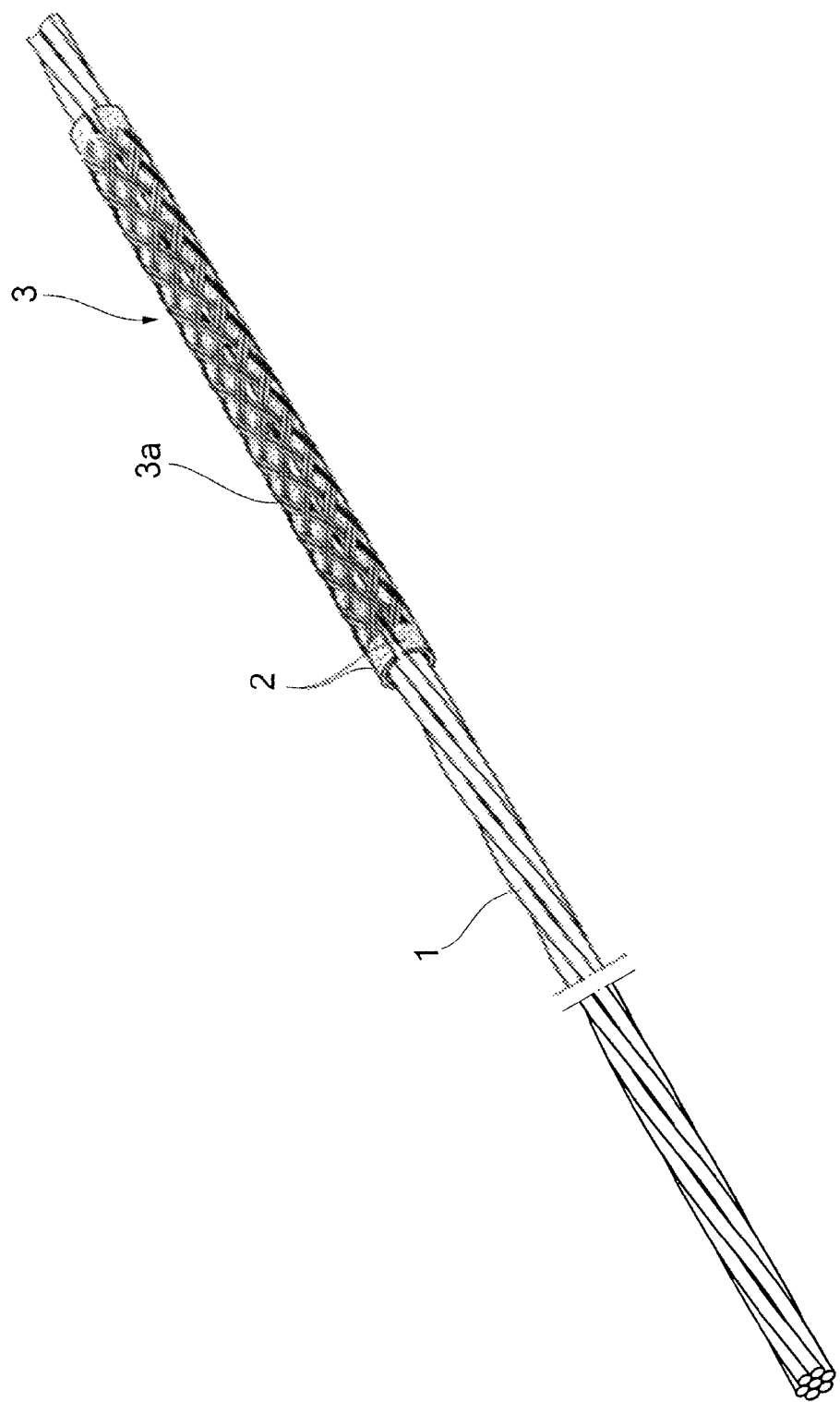
FIG. 3 is a perspective view illustrating a manufacturing step of an end anchoring structure.

With reference to FIG. 3, the end portion of the CFRP cable 1 covered with the friction sheet 2 is further covered with a braided net tube 3. The braided net tube 3 shown in FIG. 3 is obtained by forming two sets of strands 3a, each strand of which is the result of twisting together a plurality of steel or iron wires having a Vickers hardness of 100 to 300, and braiding the two sets of strands into a tubular shape. The braided net tube 3 has a cavity along its longitudinal direction and exhibits stretchability.

Similar to the friction sheet 2, the braided net tube 3 also has a length greater than the longitudinal length of the wedge 5, described later. The length of the braided net tube 3 may be less than or greater than the length of the friction sheet 2.

Since the braided net tube 3 has stretchability, the diameter of the cavity is enlarged when both ends of the tube are grasped and made to approach each other. Conversely, the diameter of the cavity is reduced when both ends of the tube are grasped and moved away from each other. If both ends of the braided net tube 3 are pulled in the direction that separates them from each other in a state in which the portion of the CFRP cable 1 covered with the friction sheet 2 is situated inside the cavity of the braided net tube 3, the diameter of the cavity of the braided net tube 3 diminishes and the braided net tube 3 comes into intimate contact with the surface of the friction sheet 2.

Figure 4:
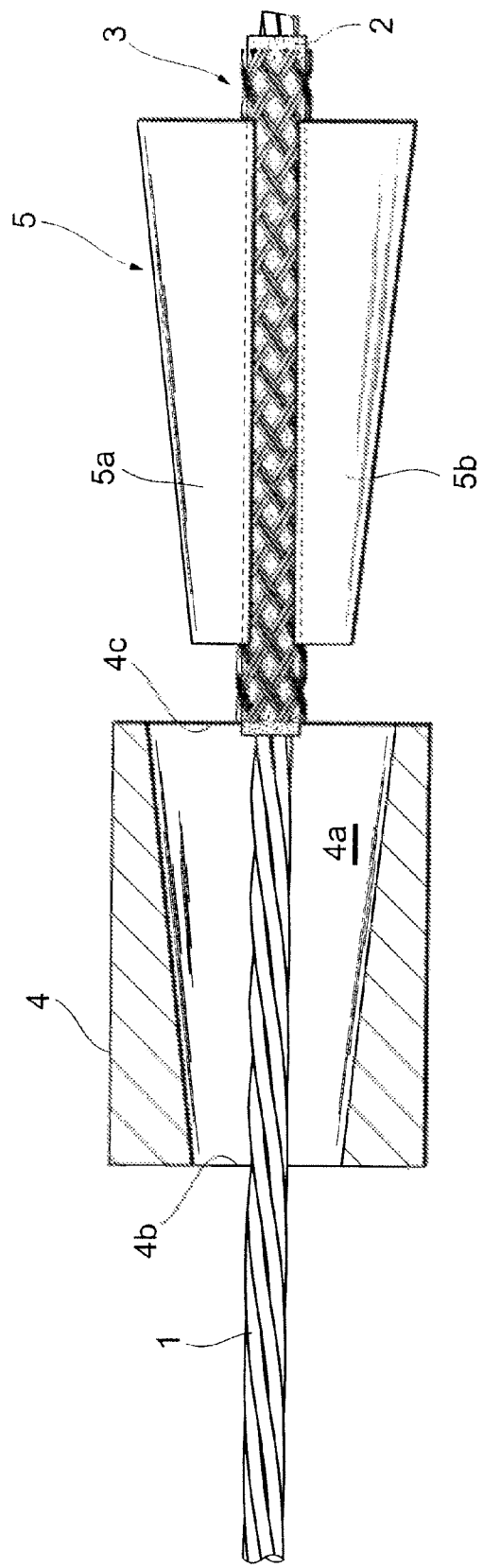
FIG. 4 is a sectional view illustrating a manufacturing step of an end anchoring structure.

With reference to FIG. 4, an end socket 4 and a wedge 5 are prepared. The end socket 4 is made of metal (e.g., stainless steel or iron), the external shape thereof is cylindrical and it has an approximately conical hollow portion 4a in the interior thereof. The end portion of the CFRP cable 1 that is covered with the braided net tube 3 is inserted into the hollow portion 4a of end socket 4 from the side of a small opening 4b of the end socket 4 and emerges from the side of a large opening 4c.

The wedge 5 is fitted onto the end portion of the CFRP cable 1 that has emerged to the exterior of the end socket 4. The wedge 5 comprises an upper-half body 5a and a lower-half body 5b that are identical in shape. When the upper-half body 5a and lower-half body 5b are combined, the result is an approximately conical external shape. The approximately conical external shape of the wedge 5 obtained by combining the upper-half body 5a and lower-half body 5b is a shape substantially identical with that of the approximately conical hollow portion 4a of end socket 4.

A shallow recess Sc having the shape of a semicircular column is formed longitudinally in the inner surface of each of the upper-half and lower-half bodies 5a and 5b (see FIG. 1). A portion of the braided net tube 3 is placed in the recesses 5c of the upper-half body 5a and lower-half body 5b. Since the recesses 5c are shallow, a clearance is formed in the longitudinal direction between the upper-half body 5a and lower-half body 5b in a state in which the end portion of the CFRP cable 1 is embraced without the entirety of the end portion of CFRP cable 1 (the portion where the braided net tube 3 is situated) being fitted into the recesses 5c.

Figure 5:
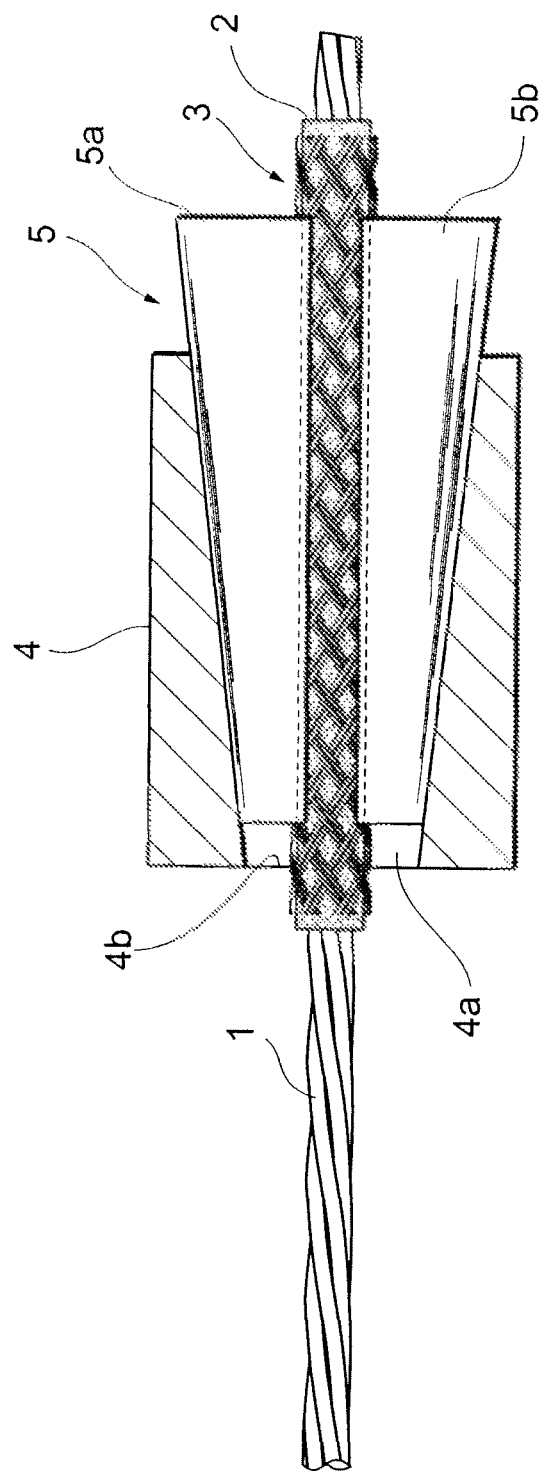
FIG. 5 is a sectional view illustrating a manufacturing step of an end anchoring structure.

With reference to FIG. 5, the wedge 5 is pushed into the hollow portion 4a of end socket 4 from the side of the end socket 4 having the large opening. With reference to FIG. 6, the upper-half body 5a and lower-half body 5b are restrained and secured from the periphery thereof by the inner wall of the end socket 4 when the wedge 5 is pushed strongly into the end socket 4. As a result, the end socket 4 is secured to the end portion of the CFRP cable 1 via the wedge 5 (and further the braided net tube 3 and friction sheet 2 described above) (see FIG. 1).

Table 1 illustrates the test results of an evaluation test applied to each of six end anchoring structures (Specimen 1 to 6) having different structures.

ing structure using the above-mentioned wedge 5, and a terminal socket was secured to the other end by an end anchoring structure using a thermosetting resin. The end sockets at both ends were placed in a tensile tester and the terminal socket having the end anchoring structure using the thermosetting resin was tensioned at a prescribed tensioning speed.

Further, in the tensile test, each of the specimens was subjected to the test multiple times and the anchoring efficiency (%) was calculated for each test conducted multiple times. Shown in Table 1 are the minimum values (Min) and maximum values (Max) of anchoring efficiency (%) obtained in the tests conducted multiple times. Anchoring efficiency is calculated according to the following equation:

anchoring efficiency (%)=breaking load (or pull-out load)/assured breaking load (=184 kN)×100

With reference to Table 1, there are occasions where anchoring efficiency falls below 100% when the end anchoring structure using the wedge 5 is adopted. The reason for this is that at the portion of the end anchoring structure, the CFRP cable 1 is embraced from its periphery and, hence, the CFRP cable 1 readily breaks or is damaged at the portion of the end anchoring structure. In the evaluation section of Table 1, an YES is shown for specimens for which an anchoring efficiency of 95% or greater was obtained as the maximum value, and a NO is shown for specimens for which only an anchoring efficiency of less than 95% was obtained as the maximum value.

TABLE 1

|  | SPECIMEN 1 | SPECIMEN 2 | SPECIMEN 3 | SPECIMEN 4 | SPECIMEN 5 | SPECIMEN 6 |
|---|---|---|---|---|---|---|
| BUFFER | BRAIDED NET TUBE | | | | | ALUMINUM TUBE |
| WIRE DIAMETER (mm) | 0.20 | 0.40 | 0.25 | 0.60 | 0.40 | — |
| STRAND CONFIGURATION | 1 × 7 | 1 × 7 | 3 × 7 | 1 × 7 | 1 × 7 | — |
| STRAND DIAMETER (mm) | 0.60 | 1.20 | 1.62 | 1.80 | 1.20 | — |
| FRICTION SHEET | WITH | WITH | WITH | WITH | WITHOUT | WITH |
| ANCHORING Min | 85 | 98 | 95 | 89 | 43 | 77 |
| EFFICIENCY Max (%) | 97 | 105 | 102 | 99 | 65 | 90 |
| EVALUATION | YES | YES | YES | YES | NO | NO |

According to the evaluation test, as shown in Table 1, there were fabricated end anchoring structures (specimens) having a different "WIRE DIAMETER" of the wire constituting the braided net tube 3, "STRAND CONFIGURATION" and "STRAND DIAMETER" of the strands 3a each obtained by twisting together a plurality of wires, and "FRICTION SHEET (WITH or WITHOUT)" that covers the peripheral surface of the CFRP cable 1, and each of the fabricated end anchoring structures was subjected to tensile testing (Specimens 1 to 5) Furthermore, an end anchoring structure obtained by embracing the friction sheet 2 by an aluminum tube instead of the braided net tube 3 was fabricated and subjected to tensile testing (Specimen 6).

Used as the CFRP cable 1 was one having a diameter of about 12.5 mm in which wires having a diameter of about 4.2 mm, consisting of a composite of carbon fibers and epoxy resin, were arranged in a 1×7 structure (a structure in which seven wires are twisted about the periphery of a single wire at the center). The assured breaking load of the CFRP cable 1 was 184 kN and the actual breaking load was 200 kN.

In the tensile test, the end socket 4 was secured to one end of the CFRP cable 1 of a prescribed length by the end anchor- With reference to the test results regarding Specimen 5, the CFRP cable 1 pulled out of the end socket 4 during tensile testing and only a small anchoring efficiency could be obtained with regard to the end anchoring structure ("WITHOUT" friction sheet) in which the CFRP cable 1 is covered directly with the braided net tube 3 without the interposition of the friction sheet 2. It will be understood that the friction sheet 2 is necessary in order to obtain a high anchoring efficiency (a high tensile strength).

With reference to Specimen 6, the CFRP cable 1 pulled out of the end socket 4 during tensile testing and only a small anchoring efficiency could be obtained even with regard to the end anchoring structure obtained by covering the CFRP cable 1 with the friction sheet 2 and covering this from above with the aluminum tube instead of the braided net tube 3. It will be understood that the braided net tube 3 also is necessary in order to obtain a high anchoring efficiency.

With the end anchoring structures (Specimens 1 to 4) obtained by covering the CFRP cable 1 with the friction sheet 2 and further covering this from above with the braided net tube 3, the CFRP cable 1 did not pull out of the end socket 4 in the tensile test. The anchoring efficiency was calculated with regard to all of the Specimens 1 to 4 using the load that prevailed at the moment of breakage of the CFRP cable 1.

By comparing the test results for Specimens 2 and 3, it was confirmed that the disparity between the configurations (the 1×7 configuration and the 3×7 configuration) of the strands constituting the braided net tube 3 do not have much effect upon the anchoring efficiency.

By contrast, with reference to the test results for Specimens 1 and 4, it was confirmed that if the wire diameter of the wires constituting the braided net tube 3 is reduced to thereby reduce the diameter of strand 3a (Specimen 1) or if the wire diameter of the wires constituting the braided net tube 3 is enlarged to thereby enlarge the diameter of strand 3a (Specimen 4), then this will have an effect, although small, upon the anchoring efficiency. Anchoring efficiency did not fall below 95% if the diameter of strand 3a constituting the braided net tube 3 was between 1.20 mm (Specimen 2) and 1.62 mm (Specimen 3).

In the end anchoring structures of the above-described embodiment (Specimens 1 to 4), the end portion of the CFRP cable 1 is covered with the friction sheet 2 coated with the abrasive particles 2a, and this is covered from above with the braided net tube 3 obtained by braiding the strands 3a. However, a multiplicity of abrasive particles (aluminum oxide, silicon carbide, etc.) may just as well be adhered (applied) also to the inner peripheral surface of the braided net tube 3. This will make it even more difficult for the end portion of the CFRP cable 1 to pull out of the end socket 4. It goes without saying that the multiplicity of abrasive particles 2a may just as well be adhered (applied) not only to the inner peripheral surface of the braided net tube 3 but also to the outer peripheral surface thereof.

The invention claimed is:

1. An end anchoring structure of a fiber-reinforced plastic filament body in which an end portion of a fiber-reinforced plastic filament body is covered with a friction sheet having abrasive particles adhered to top and bottom surfaces thereof, the friction sheet is covered from above with a braided net tube obtained by braiding a metal wire, and the portion covered with said friction sheet and braided net tube is embraced and secured inside an end socket by a wedge.

2. An end anchoring structure according to claim 1, in which said friction sheet and said braided net tube both have a length in the longitudinal direction thereof greater than the length of said wedge in the longitudinal direction thereof.

3. An end anchoring structure according to claim 2, in which said friction sheet covers said fiber-reinforced plastic filament body in multiple layers.

4. An end anchoring structure according to claim 2, in which said braided net tube is obtained by braiding a strand formed by twisting together a plurality of metal wires.

5. An end anchoring structure according to claim 2, in which abrasive particles are adhered to at least the inner peripheral surface of said braided net tube.

6. An end anchoring structure according to claim 1, in which said friction sheet covers said fiber-reinforced plastic filament body in multiple layers.

7. An end anchoring structure according to claim 6, in which said braided net tube is obtained by braiding a strand formed by twisting together a plurality of metal wires.

8. An end anchoring structure according to claim 6, in which abrasive particles are adhered to at least the inner peripheral surface of said braided net tube.

9. An end anchoring structure according to claim 1, in which said braided net tube is obtained by braiding a strand formed by twisting together a plurality of metal wires.

10. An end anchoring structure according to claim 9, in which abrasive particles are adhered to at least the inner peripheral surface of said braided net tube.

11. An end anchoring structure according to claim 1, in which abrasive particles are adhered to at least the inner peripheral surface of said braided net tube.

12. An end anchoring structure according to claim 11, in which abrasive particles are adhered to at least the inner peripheral surface of said braided net tube.

13. A method of anchoring an end of a fiber-reinforced plastic filament body, comprising:

covering an end portion of a fiber-reinforced plastic filament body with a friction sheet having abrasive particles adhered to top and bottom surfaces thereof, further covering the friction sheet from above with a braided net tube obtained by braiding a metal wire, embracing by a wedge the portion covered with said friction sheet and braided net tube, and wedging this portion inside an end socket.

* * * * *